Dec. 16, 1952
P. H. DE BRUIJN
2,622,087
PROCESS FOR THE SEPARATION OF
ANTHRACENE, PHENANTHRENE, AND
CARBAZOLE
Filed July 5, 1950
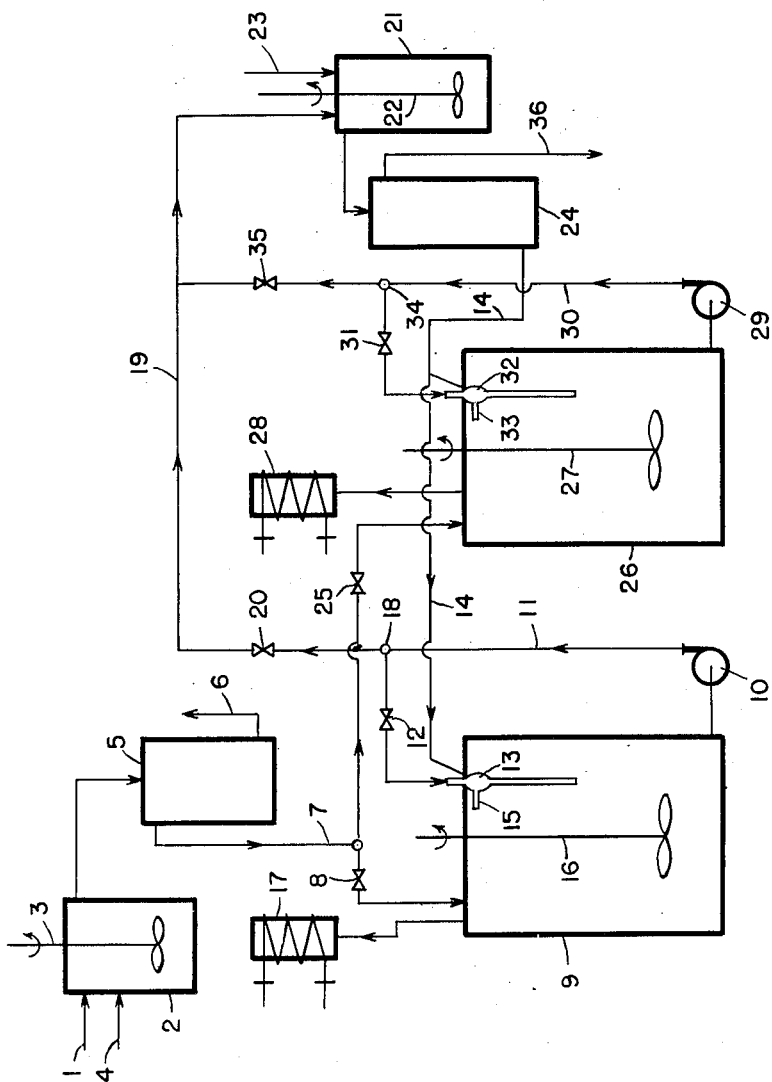
INVENTOR
PAULUS HENDRICUS de BRUIJN
BY Cushman, Darby & Cushman
ATTORNEYS Patented Dec. 16, 1952

2,622,087

UNITED STATES PATENT OFFICE 2,622,087

PROCESS FOR THE SEPARATION OF ANTHRACENE, PHENANTHRENE, AND CARBAZOLE

Paulus H. de Bruijn, Geleen, Netherlands, assignor to De Directie Van De Staatsmijnen In Limburg, Heerlen, Netherlands Application July 5, 1950, Serial No. 172,128
In the Netherlands July 8, 1949

5 Claims. (Cl. 260—318)

This invention relates to the separation of anthracene, phenanthrene and carbazole from complex mixtures thereof, such as the anthracene cut of coal tar fractions.

Field of invention

The socalled anthracene cut of coal tar distillate fractions constitutes a complex mixture composed principally of anthracene, phenanthrene and carbazole. Many processes have been suggested heretofore and used for the separation of such mixtures into these three principal components to obtain the components as substantially pure compounds. One known method involves the treatment of the crude anthracene cut with concentrated sulfuric acid, preferably when dissolved in an inert solvent, in order to transform the carbazole into an insoluble carbazole sulfate. This type of treatment possesses the undesirable possibility of having losses of valuable products occur, due to sulfonation. Accordingly, special precautions must be taken in order to avoid losses due to sulfonation. It has been found that, if the addition of the sulfuric acid to the anthracene cut is accomplished at a temperature range from 20–30° C., losses due to sulfonation can be materially reduced. A disclosure of such a process is found in British Patent No. 548,877.

While the process described in the indicated British patent constitutes the latest development in this field, it is, nevertheless, attained with certain difficulties. For example, according to the disclosed process, carbazole sulfate is obtained as a sticky precipitate which causes clogging of the apparatus employed in the operations described in the patent. Moreover, the separation of solutions accomplished by continuous filtration in that process is greatly hampered, not only by clogging but also because the precipitation of the carbazole sulfate takes too much time and in many cases, unseparable emulsions are formed.

Objects

A principal object of this invention is the provision of a new process, and new steps in the process, for the separation of complex mixtures containing anthracene, phenanthrene and carbazole into these separate components.

Further objects include:

(1) The provisions of such separation procedures which can be accomplished without the use of filters, centrifuges and the like;

(2) The provision of separation procedures in which no emulsions are formed, but rather the precipitated carbazole sulfate is cleanly precipitated from the reaction liquors and clear carbazole-free solutions are obtained;

(3) The provisions of a new and unique method of separating carbazole sulfate from the reaction mixture of sulfuric acid with anthracene cut or equivalent complex mixtures;

(4) The provision of such procedures in which the anthracene cut is reacted with sulfuric acid as a solution in an inert solvent with a unique method of operation being used which permits anthracene to be easily recovered from the clear carbazole-free liquors subsequent to the recovery of the carbazole sulfate therefrom;

(5) The provision of such procedures which substantially eliminate losses of valuable products due to sulfonation.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

General description

These objects are accomplished according to the present invention by adding an excess of sulfuric acid, i. e., at least one mol of sulfuric acid for each mol of carbazole in the anthracene cut or other complex mixtures, intensively stirring the resulting mixture, while the same is contained in a confined zone, continuing said intensive stirring until a precipitate separates from the reaction mixture as a firmly adhering mass upon the inner surface of said confined zone, removing the clear, carbazole-free liquor from said confined zone and then decomposing the recovered precipitate into carbazole by reaction with water.

The success of this present invention depends primarily upon the discovery that the peculiar properties of the precipitated carbazole sulfate, which has hitherto been considered to be a distinct disadvantage, can be utilized to bring about the separation of the carbazole sulfate from the remainder of the reaction mixture. Thus, it has been discovered that by stirring the reaction mixture intensively in a confined zone, such as a cylindrical reaction vessel, the carbazole sulfate will be completely converted into a precipitate which adheres to the side walls and bottom of the reaction vessel. This permits a clear, carbazole-free solution to be easily discharged from the confined zone in a simple manner, such as by decantation. Accordingly, complicated separation procedures, such as filtration or centrifuging, in such operations are eliminated.

Detailed description

A more complete understanding of this invention and the procedures involved can be had by reference to the accompanying drawing which constitutes a diagrammatic illustration of apparatus which can be employed in carrying out the new procedures described herein. Referring to the drawing, the method of operation can be described as follows:

From the pipe 1, a solution of crude anthracene in benzene is fed into the scrubber 2, which is provided with an agitator 3. In the said scrubber, the solution is subjected to a preliminary washing with sulfuric acid, having a concentration of 72%, which is supplied through the pipe 4. Then, the washed solution is separated from the sulfuric acid in the separator 5 and is carried off through the pipe 6.

Through the pipe 7, the pre-cleaned solution is passed into the reaction vessel 9 through the valve 8, the valve 25 being closed. In the reaction vessel 9, the solution is circulated by means of the pump 10 and the circulation pipe 11 which is provided with a valve 12. At the end of the circulation pipe 11, an aspiration device 13 is located and sulfuric acid, having a concentration of 90% is drawn from the pipe 14, while air or an inert gas, such as nitrogen, supplied through the pipe 15, is fed into the solution, so that a proper distribution of the sulfuric acid in the anthracene solution is promoted.

Formation of carbazole sulfate takes place in the reaction vessel 9 which is provided with an agitator 16. In order to avoid losses, due to evaporation, which may be caused when operating at an elevated temperature, the reaction vessel 9 is provided with a reflux cooler 17. By the action of the sulfuric acid, the carbazole is rapidly converted into a precipitate adhering to the wall and the bottom of the reaction vessel 9. The liquid circulating through the circulation pipe 11 contains only little carbazole, so that the said circulation pipe mainly serves to effect a proper distribution of the sulfuric acid in the anthracene solution by means of the aspiration device 13.

Through the pipe 19, provided with a valve 20, a quantity of solution coming from the circulation pipe 11 is continuously passed into the vessel 21 with the help of the regulating device 18, the latter being adjusted in such a manner, that a quantity of liquid is carried off about equal to the quantity flowing into the reaction vessel 9 from the pipes 7 and 14.

In the vessel 21, which is provided with an agitator 22, the anthracene solution carried off through the pipe 19 is freed from the carbazole still present therein by subjecting it to a secondary treatment with sulfuric acid, having a concentration of 90% and coming from the pipe 23, by which treatment the said carbazole is dissolved in the sulfuric acid. The sulfuric acid, which, consequently, contains dissolved carbazole sulfate, is separated in the separator 24 and passed to the aspiration device 13 through the pipe 14. The purified anthracene solution leaves the separator through the pipe 36 after which, with a view to the recovery of anthracene and phenanthrene, it is passed to a caustic soda washer, evaporating and crystallizing apparatus (omitted from the drawing).

After such an amount of sulfuric acid-containing carbazole sulfate has been formed in the reaction vessel 9 as is required for its decomposition in the said reaction vessel, the latter is switched off and the second reaction vessel 26 is put into operation. For this purpose, valve 8 is closed and valve 25 is opened, so that the anthracene solution, coming from the pipe 7, is delivered into the reaction vessel 26, which is provided with an agitator 27 and a reflux cooler 28, through which it is circulated by means of the pump 29, the circulation pipe 30 and the valve 31. In the same way as circulation pipe 11, the circulation pipe 30 is provided with an aspiration device 32, in which sulfuric acid, supplied by the pipe 14, and air or inert gas, supplied by the pipe 33, are distributed through the solution. By means of the regulating device 34 and the valve 35, part of the solution is passed from the circulation pipe 30 to the vessel 21 through the pipe 19.

In this manner, the reaction vessels 9 and 26 are used alternately, the off-stream reaction vessel being regularly cleaned by decomposing the precipitate of carbazole sulfate present therein with water. By cooling the vessel walls, the temperature in the reaction vessels 9 and 26 is kept between 20° and 30° C. during the precipitation of the carbazole sulfate.

Example

A solution of 150 parts by weight of crude anthracene, containing 44.5% anthracene and 40.5% carbazole, dissolved in 8000 parts by weight of benzene, is given a preliminary wash with sulfuric acid having a concentration of 72%. Subsequently, 200 parts by weight of 90% sulfuric acid are supplied to the solution while the latter is intensively stirred in a cylindrical vessel equipped with a propeller stirrer, and stirring is continued for 30 minutes. A precipitate forms, consisting of carbazole sulfate and sulfuric acid and deposits against the wall and bottom of the reaction vessel. The clear carbazole-free solution is removed from the reaction vessel by decantation.

56 parts by weight of anthracene (purity over 98%, melting point 214° C.) crystallize from the said solution after the latter is washed with caustic soda solution and evaporated. After the solvent has been removed by distillation, the mother liquor yields crude phenanthrene (purity 60–80%). By decomposing the precipitated carbazole sulfate with water, 50 parts by weight of carbazole (purity over 98%, melting point 241° C.) are obtained therefrom.

Operation details

The quantity of sulfuric acid employed in the separation can be varied. Preferably, it should be larger than that which is required for converting the carbazole in the anthracene cut into carbazole sulfate. In other words, at least one mol of sulfuric acid for each mol of carbazole should be employed. Preferably, the excess of sulfuric acid employed should not exceed ten mols per mol of carbazole, because if too much sulfuric acid is used, a thin paste of carbazole sulfate and sulfuric acid is obtained instead of an adhering precipitate, thus reducing the effectiveness of the new operations.

The addition of the sulfuric acid to the crude anthracene cut can be accomplished in various manners. Preferably, the addition of sulfuric acid is accomplished rapidly and most desirable results are obtained when the sulfuric acid is added all at once to a solution of anthracene in an inert solvent which is intensively stirred in a confined zone.

The time of reaction and stirring is not critical and may be varied. Generally, a period of from 10 to 30 minutes is sufficient to convert the total of carbazole present into a precipitate and to collect the precipitate as a mass upon the inner walls and bottom of the reaction vessel.

Various temperatures may be employed in carrying out the separation. However, a temperature between about 20 and 30° C. is preferred and apparatus which may bring about a cooling of the reaction mixture can advantageously be used.

A wide choice of solvents for forming the solution of anthracene cut is available. The solvent used should be water immiscible and should be liquid at ambient temperature. Liquid hydrocarbons are preferred and, especially, aromatic hydrocarbons, such as benzene, toluene, xylenes, butyl benzenes and the like.

Quantities of solvent used are not critical and, it is unnecessary to start from a solution of crude anthracene which is saturated at the reaction temperature. However, I have discovered that a considerably smaller amount of solvent will be consumed by starting with a solution saturated as to carbazole at a temperature higher than the used reaction temperature, usually ranging between 50° and 60° C. The said solution is not saturated with respect to all constituents of the crude anthracene, namely not with respect to anthracene, but is saturated with respect to carbazole. During the reaction, when the temperature of the solution drops to the reaction temperature, the solution becomes saturated with respect to anthracene. When the said hot solution (50° to 60° C.) is fed into the reaction vessel, the reaction velocity at which the carbazole is converted is so high that no carbazole crystals are formed, while a solution is obtained which is almost saturated with anthracene. If the process is carried out in this manner, the preliminary cleaning of the crude anthracene solution should likewise be carried out at the temperature of the solution which preferably ranges between 50° and 60° C.

The procedure as described herein is applicable to any complex mixture comprising carbazole in admixture with anthracene or phenanthrene or both. Proportions between the components of the mixture are not important. Such mixtures are obtained as a by-product in the coking of coal and are recovered as the anthracene cut of coal tar. When such crude anthracene cuts are treated in accordance with this process, it is desirable to free the crude starting material from impurities. This may be done by subjecting the material to a pre-washing, preferably with sulfuric acid. The acid used for this washing must have a lower concentration than is required for the formation of carbazole sulfate. Preferably, sulfuric acid having a concentration of 65–75% is used as the washing liquor.

The treatment with sulfuric acid may be carried out several times in the same reaction vessel without removing the precipitate of carbazole sulfate therefrom. If the latter procedure is adopted, a fresh amount of crude anthracene solution is fed into the reaction vessel and treated with sulfuric acid after the carbazole-free solution has been discharged from the reaction vessel. In this manner, a larger amount of precipitate can be obtained in the same reaction vessel which is of advantage in the further processing of the said precipitate into carbazole. The decomposition of the carbazole sulfate precipitate for the preparation of carbazole may be carried out in any known manner, usually by treatment with water. The carbazole obtained has a high degree of purity, i. e., over 97%.

If the decomposition of the precipitate of sulfuric acid-containing carbazole sulfate is carried out in the manner described in my co-pending application Serial No. 166,289, filed June 5, 1950, and now U. S. Patent No. 2,575,314, in the presence of a solvent for the extraction of the liberated carbazole, the precipitation of the carbazole sulfate in the reaction vessel is preferably continued until an amount of precitate has been formed which, in the same reaction vessel, can be decomposed and recovered with only one charge of solvent and water. The sulfuric acid, having a concentration of 65 to 75%, and preferably of 72%, as obtained in the decomposition, is returned into the process through the pipe 4, for the preliminary cleaning of the crude anthracene solution, as mentioned above.

After the carbazole-free solution has been washed, in order to remove the entrained sulfuric acid, purified anthracene can be prepared from the said solution by crystallizing the anthracene in any known manner. The anthracene thus obtained, is practically free from carbazole and phenanthrene, its anthracene content amounts to over 98%.

After the anthracene has been removed, phenanthrene may be obtained from the solution by means of a continued crystallization or when a high purity of the product is not required by removing the solvent by evaporation, after which a slightly colored mass of phenanthrene crystals is left.

*Summary*

The present invention, as described above, provides new improvements in the general art of separating anthracene cuts or similar complex mixtures into the individual components thereof. Operating as described, it has been found that anthracene, phenanthrene and carbazole may be separated from a mixture of the same and after final treatment, carbazole having a purity of at least 97% and anthracene having a purity of at least 98% can be obtained. These recoveries of high purity material, moreover, are accomplished without the use of filters, centrifuges, or similar separating equipment which has presented a problem in this general field heretofore, because of clogging or the like with a sticky precipitate of carbazole sulfate. The discovery as described, which has made the new methods possible, is simple in principle but has served to solve problems which have long confronted the industry. These new methods have been applied on a commercial scale and have been found to operate with surprising success and freedom from trouble.

I claim:

1. A process for the separation of anthracene, phenanthrene, and carbazole from a complex mixture thereof, which comprises dissolving said complex mixture in a water immiscible solvent, adding an excess of sulfuric acid of 90% strength to said complex mixture, the quantity of acid added not exceeding 10 mols per mol of carbazole in said complex mixture, intensively stirring the resulting reaction mixture in a confined zone, continuing said intensive stirring until a precipitate separates from the reaction mixture as a firmly adherent mass upon the inner surfaces of said confined zone, removing the remaining liquor from said zone and decomposing said precipitate into carbazole by reaction with water.

2. A process for the separation of anthracene, phenanthrene, and carbazole from a complex mixture thereof, which comprises dissolving said complex mixture in a liquid hydrocarbon, the quantity of said hydrocarbon to said complex mixture being such that the solution is saturated with carbazole at between 50 and 60° C., heating the solution to between 50 and 60° C., charging said heated solution into a confined zone, while simultaneously cooling the same to between 20 and 30° C. and mixing sulfuric acid of 90% strength therewith, the quantity of sulfuric acid admixed being between about one and ten mols for each mol of carbazole in said complex mixture, intensively stirring the resulting reaction mixture in said confined zone, continuing said intensive stirring until a precipitate separates from the reaction mass as a firmly adherent mass upon the inner surfaces of said confined zone, removing the remaining liquor from said zone and decomposing said precipitate into carbazole by reaction with water.

3. A process according to claim 1, wherein after said remaining liquor has been removed from the confined zone, a fresh solution of the initial mixture is fed into said zone and the treatment with sulfuric acid is carried out in the presence of the precipitate obtained in the preceding treatment with sulfuric acid.

4. A process according to claim 1, wherein the sulfuric acid is at once added to said complex mixture.

5. A process according to claim 1, in which the treatment with sulfuric acid is carried out in a continuous manner by bringing together the sulfuric acid and the complex mixture continuously, a fine distribution being obtained by aspirating an inert gas into the mixed streams of acid and complex mixture.

PAULUS H. DE BRUIJN.

REFERENCES CITED

The following references are of record in the file of this patent:

UNITED STATES PATENTS

| Number | Name | Date |
|---|---|---|
| 2,242,842 | Weinmayr | May 20, 1941 |
| 2,459,135 | Rottschaefer | Jan. 11, 1949 |